United States Patent
Zhang et al.

(10) Patent No.: US 10,820,296 B2
(45) Date of Patent: Oct. 27, 2020

(54) GENERATING WIRELESS NETWORK ACCESS POINT MODELS USING CLUSTERING TECHNIQUES

(71) Applicant: Google LLC, Mountain View, CA (US)

(72) Inventors: Ying Zhang, Cupertino, CA (US); Gabriel Leblanc, Sunnyvale, CA (US); Robert Fraser, Sunnyvale, CA (US); Xiao Meng Zhang, Sunnyvale, CA (US); Bhaskar Mehta, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 16/068,568

(22) PCT Filed: Jun. 21, 2017

(86) PCT No.: PCT/US2017/038441
§ 371 (c)(1),
(2) Date: Jul. 6, 2018

(87) PCT Pub. No.: WO2018/236364
PCT Pub. Date: Dec. 27, 2018

(65) Prior Publication Data
US 2020/0154392 A1    May 14, 2020

(51) Int. Cl.
*H04W 64/00* (2009.01)
*H04B 17/318* (2015.01)
(Continued)

(52) U.S. Cl.
CPC ........ *H04W 64/003* (2013.01); *H04B 17/318* (2015.01); *H04W 24/10* (2013.01); *H04W 76/11* (2018.02)

(58) Field of Classification Search
CPC ... H04W 64/003; H04W 76/11; H04W 24/10; H04W 84/12; H04B 17/318
See application file for complete search history.

(56) References Cited

U.S. PATENT DOCUMENTS

| 6,092,072 A | 7/2000 | Guha et al. |
| 2005/0136845 A1* | 6/2005 | Masuoka ............... G01S 5/0294 455/67.14 |

(Continued)

FOREIGN PATENT DOCUMENTS

| CN | 105027632 A | 11/2015 |
| CN | 105874857 A | 8/2016 |
| KR | 101606382 B1 | 3/2016 |

OTHER PUBLICATIONS

Zhong et al., "Wifi Indoor Localization Based on K-Means", 5 pgs. (2016).

(Continued)

*Primary Examiner* — Chi Ho A Lee
(74) *Attorney, Agent, or Firm* — Lerner, David, Littenberg, Krumholz & Mentlik, LLP

(57) ABSTRACT

The technology relates to generating a wireless network access point model for determining locations within an area. In one example, a plurality of scan vectors, each scan vector representing a set of signal strengths for a set of wireless network access point identifiers and being associated with a location within the area at which a mobile device moving through the area measured the set of signal strengths are received. A set of clusters is generated by iterating through a split phase until the number of clusters in the set of clusters equals a maximum number of clusters or there are no bad scan vectors identified. A bad scan vector may include a vector having a vector difference from a center of a cluster to which that vector is assigned is less than a minimum similarity value. The set of cluster is then used to generate the model of the area.

31 Claims, 10 Drawing Sheets

(51) Int. Cl.
*H04W 76/11* (2018.01)
*H04W 24/10* (2009.01)

(56) References Cited

U.S. PATENT DOCUMENTS

| | | | | |
|---|---|---|---|---|
| 2010/0080134 | A1* | 4/2010 | Maniatopoulos | H04W 48/16 370/252 |
| 2011/0070863 | A1 | 3/2011 | Ma et al. | |
| 2011/0080267 | A1* | 4/2011 | Clare | G01S 13/82 340/10.4 |
| 2011/0083195 | A1* | 4/2011 | Crouch | G01R 31/318558 726/27 |
| 2012/0115475 | A1* | 5/2012 | Miyake | G06Q 10/06 455/435.1 |
| 2013/0344886 | A1* | 12/2013 | Jarvis | G01S 5/0242 455/456.1 |
| 2014/0073363 | A1* | 3/2014 | Tidd | G01S 5/0242 455/456.5 |
| 2014/0106773 | A1* | 4/2014 | Li | H04W 64/00 455/456.1 |
| 2014/0278054 | A1* | 9/2014 | Tidd | G01S 19/49 701/409 |
| 2014/0361927 | A1* | 12/2014 | Jarvis | G01S 5/0294 342/451 |
| 2016/0165566 | A1 | 6/2016 | Jung | |
| 2016/0183059 | A1* | 6/2016 | Nagy | H04W 4/029 455/456.5 |

OTHER PUBLICATIONS

Razavi, et al., "K-Means Fingerprint Clustering for Low-Complexity Floor Estimation in Indoor MobileLocalization", 7 pgs. (2015).
Chen, et al., "Self-adaptive Wi-Fi Indoor Positioning Model", A K-Means and Artificial Neural Networks Method. (2015) 6 pgs.
Liu, et al., "Coordinate-Based Clustering Method for Indoor Fingerprinting Localization in Dense Cluttered Environments" (2016), 26 pgs.
Aggarwal, et al., "Adaptive Sampling for k-Means Clustering" (2009), 15 pgs.
Li, et al., "A Wi-Fi Indoor Localization Strategy Using Particle Swarm Optimization Based Artificial Neural Networks" (2016), 10 pgs.
Muñoz-Organero, Mario and Brito-Pacheco, Claudia, "Improving Accuracy and Simplifying Training in Fingerprinting-Based Indoor Location Algorithms at Room Level" (2016), 33 pgs.
Saeed, Ali H. and Ali, Dia M., "Indoor Wi-Fi Positioning System Based on K-means Cluster Analysis" (2016), 10 pgs.
Razavi, et al., "K-Means Fingerprint Clustering for Low-Complexity Floor Estimation in Indoor Mobile Localization" (2015), 7 pgs.
Bhatia, Sanjiv K., "Adaptive K-Means Clustering" (2004), 5 pgs.
Altintas, Bulut and Serif, Tacha, "Improving RSS-Based Indoor Positioning Algorithm via K-Means Clustering" (2011), 5 pgs.
Chinrungrueng, Chedsada and Sequin, Carlo H., "Optimal Adaptive K-Means Algorithm with Dynamic Adjustment of Learning Rate" (1991), 32 pgs.
<<https://en.wikipedia.org/wiki/K-means_clustering>> "k-means clustering" downloaded Apr. 26, 2017, 12 pgs.
Pham, et al., "Selection of K in K-means Clustering" (2004), 17 pgs.
Invitation to Pay Additional Fees; Communication Relating to the Results of the Partial International Search; Provisional Opinion Accompanying the Partial Search Result dated Mar. 2, 2018, for International Application No. PCT/US2017/038441. 13 pages.
International Search Report and Written Opinion for International Application No. PCT/US2017/038441, dated Apr. 25, 2018. 18 pages.
Notice of Allowance for Korean Patent Application No. 10-2018-7021077 dated Mar. 20, 2020. 3 pages.
Sian Lun Lau et al. "Wi-Fi Fingerprint Localisation using Density-based Clustering for Public Spaces: A Case Study in a Shopping Mall." 2016 6th International Conference—Cloud System and Big Data Engineering (Confluence). Jan. 14, 2006. pp. 356-360.
Office Action for Korean Patent Application No. 10-2018-7021077 dated Nov. 18, 2019.
Notification of the First Office Action for Chinese Patent Application No. 201810229489.8 dated May 26, 2020. 10 pages.

\* cited by examiner

```
K = 1
Use any scan as the center S, and assign all scans to this center.
[Update Mean]
while (K < max_num_clusters) {
  Sw = [Pick Worst Scan]
  if (Sw) {
    Add a new cluster, with the center at Sw.
    K = K + 1
    // Run K-Means algorithm with K clusters, starting at the current centers.
    for (int iter = 0; iter <max_num_em_iterations; ++iter) {
      [Update Mean]
      changed = [Update Label]
      if (not changed) break;
    }
  }
}
```

FIGURE 3

```
while (FindClustersTooSimilar(&cluster1, &cluster2)) { // Clusters 1 and 2 are too
similar and have few assigned scan vectors relative to the cluster with the greatest
number of scan vectors.
  Merge Clusters(cluster1, cluster2);
  K = K - 1
  for (int iter = 0; iter <max_num_em_iterations; ++iter) {
    [Update Mean]
    changed = [Update Label]
    if (!changed) break;
  }
}
```

FIGURE 5

For each given cluster having a plurality of assigned scan vectors and a location of a cluster center:

Keeping a list of clusters. Initially empty.

For each scan vector of the plurality of assigned scan vectors, check if the scan vector belongs to any existing cluster, by computing the physical distance to any cluster centers:
  If it is within X meters, add the scan vector to the cluster, and recompute the location of the center.
  If it is beyond X meters, create a new cluster with the center as the location of the scan vector.

After all scans are added, find the cluster with the greatest number of scans, and use the center as the center of the given cluster.

FIGURE 7

Keep a cluster, if and only if:
- The inference is to itself and the confidence >= Y, or
- The inference is to other places with confidence < 100 - Y.

Y is a threshold, can be set between 60 and 90.

FIGURE 9

Combine KMeans Models by Merging KMeans Clusters a. Cluster 1 in model B can be added to model A, if and only if there exist a cluster 2 in model A where as between the vector data at the cluster centers of cluster 1 and cluster 2, the cos-similarity >= min_cos_similarity b. Find a cluster 3 in model A that has the highest cos-similarity with cluster 1. If between the vector data at the cluster centers of cluster 1 and cluster 3 the cos_similarity >= max_cos_similarity, merge cluster 1 and cluster 3, otherwise, if a. is satisfied, just add cluster 1 to model A, if not, filter or remove cluster 1.

FIGURE 10

GENERATING WIRELESS NETWORK ACCESS POINT MODELS USING CLUSTERING TECHNIQUES

CROSS-REFERENCE TO RELATED APPLICATIONS

The present application is a national phase entry under 35 U.S.C. § 371 of International Application No. PCT/US2017/038441 filed Jun. 21, 2017, the disclosure of which is incorporated by reference herein.

BACKGROUND

Indoor localization models are typically generated using scans of wireless network access point identifiers and associated signal strengths. These scans are then arranged into models for determining locations. One common approach utilizes fingerprints. As an example, for smaller areas, the mean of signal strengths from all scans received is a good indicator for such areas and can be used as a model or fingerprint of that area. However, for larger areas, the mean of all scans can really only provide a list of wireless network access point identifiers for that area. If a larger area is closer to a smaller one, it can be difficult to differentiate by simply looking at the mean of the scans. This is often the case in buildings with many smaller rooms and larger hallways. To address this, scans can be clustered together to create a model using a K-means clustering method. In order to determine a location for a particular scan, one only need to identify the cluster to which the scan belongs.

The K-means clustering method results in a partitioning of data into K Voronoi cells. The problem is computationally difficult; however there are efficient heuristic algorithms that are commonly employed and converge quickly to a local optimum. These are usually similar to the expectation-maximization algorithm. The K-means algorithm consists of iterations of two phases: (1) an update label phase which assigns observations to the closest centers of a predetermined value for K and (2) an update mean phase which re-computes the centers according to the assignments. The iterations end when the update label phase stabilizes which provides a local optimum solution.

With a typical K-means clustering approach, K is a known value. However, in the case of indoor spaces which vary greatly, K would depend upon the size and shape of the area as well as the nature of wireless network access point distributions in that area. In more basic K-means clustering approaches, such as those used for prior wireless network access point clustering efforts, one starts with a small value for K and increases K if the sizes of one or more clusters are too large. This approach is not very efficient for a larger area, such as a mall (for instance, an indoor or outdoor grouping of stores), and cannot lead to a solution where all clusters have a similar vector difference to vector data at the cluster center.

SUMMARY

Aspects of the disclosure provide a method of generating a wireless network access point model for determining locations within an area. The method includes receiving a plurality of scan vectors, each scan vector comprising data representing a set of signal strengths for a set of wireless network access point identifiers and being associated with a location within the area at which a mobile device moving through the area measured the set of signal strengths. The method also includes performing a split phase to generate a set of clusters. This split phase includes assigning each scan vector of the plurality of scan vectors to a cluster based on a vector difference between the scan vector and vector data assigned to a center of the cluster to which the scan vector is assigned, identifying, as candidates for initiation of an additional cluster, one or more scan vectors of the plurality of scan vectors as being scan vectors for which a difference between the scan vector and the vector data assigned to the center of the cluster to which the scan vector is assigned is less than a predetermined minimum similarity value for the clusters, selecting, from the one or more scan vectors identified as candidates for initiation of an additional cluster, a scan vector which is least similar to the vector data assigned to the center of the cluster to which the scan vector is assigned, creating an additional cluster in the set of clusters and assigning the selected scan vector to the additional cluster, assigning vector data of the selected scan vector to a center of the additional cluster, recomputing vector data assigned to centers of any clusters of the set of clusters, and iterating through the split phase until a total number of clusters in the set of clusters equals a predetermined maximum number of clusters or until no further candidates for initiation of an additional cluster are identified. The method also includes generating the model for determining locations within the area based on the set of clusters.

In one example, the method also includes, prior to performing the split phase, setting the number of clusters to 1 and assigning a first vector scan of the plurality of scan vectors as a center of a first cluster of the set of clusters. In addition or alternatively, when the number of clusters equals the maximum number of clusters, the method also includes filtering the clusters to identify outliers and removing the outliers and the assigned scan vectors to thereby reduce the total number of clusters in the set of clusters. In addition, the method includes, after filtering to remove outliers, continuing to iterate through the split phase until the number of clusters again equals the maximum number of clusters or there are no one or until no further candidates for initiation of an additional cluster are identified. In addition or alternatively, the method also includes identifying at least two of the clusters in the set of clusters as being candidates for a cluster merging operation and merging the at least two clusters into a merged cluster to reduce the total number of clusters in the set of clusters, wherein the scan vectors previously assigned to the at least two clusters are re-assigned to a merged cluster. In this example, identifying the at least two clusters in the set of clusters as being candidates for the cluster merging operation includes identifying the clusters as comprising a total number of scan vectors lower than a threshold amount. In addition or alternatively, identifying the at least two clusters in the set of clusters as being candidates for the cluster merging operation includes identifying that a difference between the vector data assigned to the center of a first of the clusters and vector data assigned to the center of a second of the clusters is less than a predetermined threshold value. In addition or alternatively, the method also includes identifying, from the clusters in the set of clusters, a cluster comprising a highest number of scan vectors; for each of the other clusters in the set of clusters, determining at least one of a number of scan vectors in the cluster and at least one confidence indicator associated with the scan vectors in the cluster; filtering said other clusters based on at least one of the number of scan vectors in the cluster and the at least one confidence indicator associated with the scan vectors in the cluster; based on said filtering, selecting at least one of said other clusters; and outputting a subset of the plurality of clusters for use in location determining operations, the subset comprising the cluster identified as comprising the highest number of scan vectors and the selected at least one of said other clusters. In this example, the set of clusters upon which generation of the model is based corresponds to the subset of clusters only. In addition or alternatively, the method also includes determining, for each cluster in the set of clusters, a center location based on the locations associated with the scan vectors assigned to the cluster and for each cluster, recentering the center location of the cluster based on distances between the locations associated with the scan vectors assigned to the cluster and the center location.

Aspects of the disclosure also provide an apparatus comprising computing means for performing the example methods described above. Aspects of the disclosure also provide a computer program comprising computer-readable instructions which, when executed by at least one computing apparatus, cause the at least one computing apparatus to perform the example methods described above.

Further aspects of the disclosure provide a computer-implemented method. The method includes receiving a plurality of clusters of scan vectors determined from signals received from a plurality of wireless access points; identifying, from the plurality of clusters, a clusters comprising a highest number of scan vectors; for each of the plurality of clusters other than the cluster identified as comprising the highest number of scan vectors, determining at least one of a number of scan vectors in the cluster and at least one confidence indicator associated with the scan vectors in the cluster; filtering said other clusters based on at least one of the number of scan vectors in the cluster and the at least one confidence indicator associated with the scan vectors in the cluster; based on said filtering, selecting at least one of said other clusters; and outputting a subset of the plurality of clusters for use in location determining operations, the subset comprising the cluster identified as comprising the highest number of scan vectors and the selected at least one of said other clusters. Aspects of the disclosure also provide an apparatus comprising means for performing the aforementioned method as well as a computer program comprising computer-readable instructions which, when executed by at least one computing apparatus, cause the at least one computing apparatus to perform the aforementioned method.

Still further aspects of the disclosure provide a method of generating a wireless network access point model for determining locations within an area. The method includes receiving, by one or more server computing devices having one or more processors, a plurality of scan vectors, each scan vector representing a set of signal strengths for a set of wireless network access point identifiers and being associated with a location within the area at which a mobile device moving through the area measured the set of signal strengths; setting, by the one or more server computing devices, a maximum number of clusters; setting, by the one or more server computing devices, a minimum similarity value; performing, by the one or more server computing devices, a split phase to generate a set of clusters including. The split phase includes assigning each given scan vector of the plurality of scan vectors to a cluster based on a vector difference between the given scan vector and vector data of the assigned cluster, identifying one or more bad scan vectors of the plurality of scan vectors based on whether a vector difference each of the one or more bad scan vectors and vector data assigned to a center of a cluster to which each of the one or more bad scan vectors is assigned is less than the minimum similarity value, selecting a worst one of the one or more bad scan vectors having a greatest vector difference between the one or more bad scan vectors and vector data of a center of an assigned cluster for the worst scan vector, using the selected worst one as a center of a new cluster and thereby increasing a number of clusters in the set of clusters, recomputing vector data assigned to centers of any clusters of the set of clusters, and iterating, by the one or more server computing devices, through the split phase until the number of clusters in the set of clusters equals the maximum number of clusters or there are no one or more bad scan vectors identified. The method also includes generating the model of the area based on the set of clusters.

In one example, wherein similarity between two scan vectors, $v_1$ and $v_2$, may be defined as cosine similarity($v_1$, $v_2$), the minimum similarity value is a minimum cosine similarity, and selecting the worst one includes identifying one of the one or more bad scans having the largest value of cosine similarity between the identified one and the center of the assigned cluster of the identified one. In another example, the method also includes, prior to performing the split phase, setting the number of clusters to 1 and assigning a first vector scan of the plurality of scan vectors as a center of a first cluster of the set of clusters. In another example, the split phase further includes after recomputing vector data assigned to centers of any clusters of the set of clusters, determining whether the vector data assigned to centers of any clusters of the set of clusters has changed, when the vector data assigned to centers of any clusters of the set of clusters has changed, reassigning the plurality of scan vectors to clusters of the set of clusters, and continuing to recompute and reassign until the clusters of the set of clusters stabilize such that the vector data assigned to the centers of the any clusters does not change from the recomputing. In another example, the iterating ends when the number of clusters equals the maximum number of clusters, filtering any clusters to remove outliers. In this example, the method also includes, after filtering, continuing to iterate through the split phase until the number of clusters again equals the maximum number of clusters or there are no one or more bad scan vectors identified.

In another example, the method also includes setting, by the one or more server computing devices, a maximum similarity value and performing a merge phase including: identifying a pair of clusters of the set of clusters having vector data assigned to respective centers of each one of the pair having a similarity value that is greater than the maximum similarity value, and merging the pair of clusters and any assigned scan vectors together. In this example, identifying the pair of clusters is based on cosine similarity between the vector data assigned to the respective centers. In addition or alternatively, the method also includes repeating the merge phase until there are no pairs of clusters of the set of clusters having a similarity value that is greater than the maximum similarity value. In addition or alternatively, identifying the pair of clusters is further based on a number of scan vectors assigned to each cluster of the pair of clusters. In another example, the method also includes setting a maximum similarity value, wherein iterations through the split phase and merge phase provides the set of clusters such that in each given cluster of the set of clusters a vector difference between each scan vector assigned to the given cluster and a scan vector of a center of the given cluster is greater than the minimum similarity value, and a vector difference between the scan vector of the center of the given cluster and a scan vector of a center of any other cluster of the set of clusters is less than a maximum similarity value. In addition or alternatively, the method includes determining a center location of each given cluster of the set of clusters based on the locations associated with the scan vectors assigned to the given cluster and recentering the center location of each given cluster based on distances between the locations associated with the scan vectors assigned to the given cluster and the center location. In this example, recentering is based on whether the distances meet a threshold distance value. In addition or alternatively, the method also includes, before generating the model, filtering the set of clusters by identifying a cluster of the set of clusters having a greatest number of assigned scan vectors and filtering one or more clusters from the set of clusters based on a comparison to this greatest number of assigned scan vectors. In addition or alternatively, the method also includes, before generating the model, filtering the set of clusters to remove any clusters that do not meet a minimum number of assigned scan vectors. In addition or alternatively, each given scan vector of the plurality of scan vectors is associated with a confidence value representing a combined accuracy measurement of the signal strength measurements and an estimated location for the given scan vector, and the method further comprises, before generating the model, filtering the set of clusters based on a highest confidence value associated with the scan vectors assigned to each cluster of the set of clusters. In this example, filtering the set of clusters includes removing clusters from the set of clusters having a highest confidence value that does not meet a threshold confidence value. In addition or alternatively, at least a subset of the plurality of scan vectors corresponds to a single visit to the area by a particular mobile device, such that the single visit includes a plurality of scans, and the method further comprises filtering the plurality of scans to remove scans at a start boundary and an end boundary of the visit, such that the filtered scans are not included in the plurality of scan vectors. In this example, filtering the plurality of scans is based on an extraction rate selected to remove noise when generating the model. In addition or alternatively, each given scan vector of the plurality of scan vectors is associated with a confidence value representing a combined accuracy measurement of the signal strength measurements and an estimated location for the given scan vector, and the method further comprising, prior to performing the split phase, filtering the plurality of scan vectors to remove scan vectors associated with a confidence value that does not meet a threshold confidence value to remove noise from the model.

BRIEF DESCRIPTION OF THE DRAWINGS

FIG. 3 is an example of quasi code representing aspects of a split phase in accordance with aspects of the disclosure.

FIG. 5 is an example of quasi code representing aspects of a merge phase in accordance with aspects of the disclosure.

FIG. 7 is an example of quasi code representing aspects of a re-centering process in accordance with aspects of the disclosure.

FIG. 9 is an example of quasi code representing aspects cross filtering between models in accordance with aspects of the disclosure.

FIG. 10 is an example of quasi code representing aspects of combining models in accordance with aspects of the disclosure.

DETAILED DESCRIPTION

Overview

Figure 1:
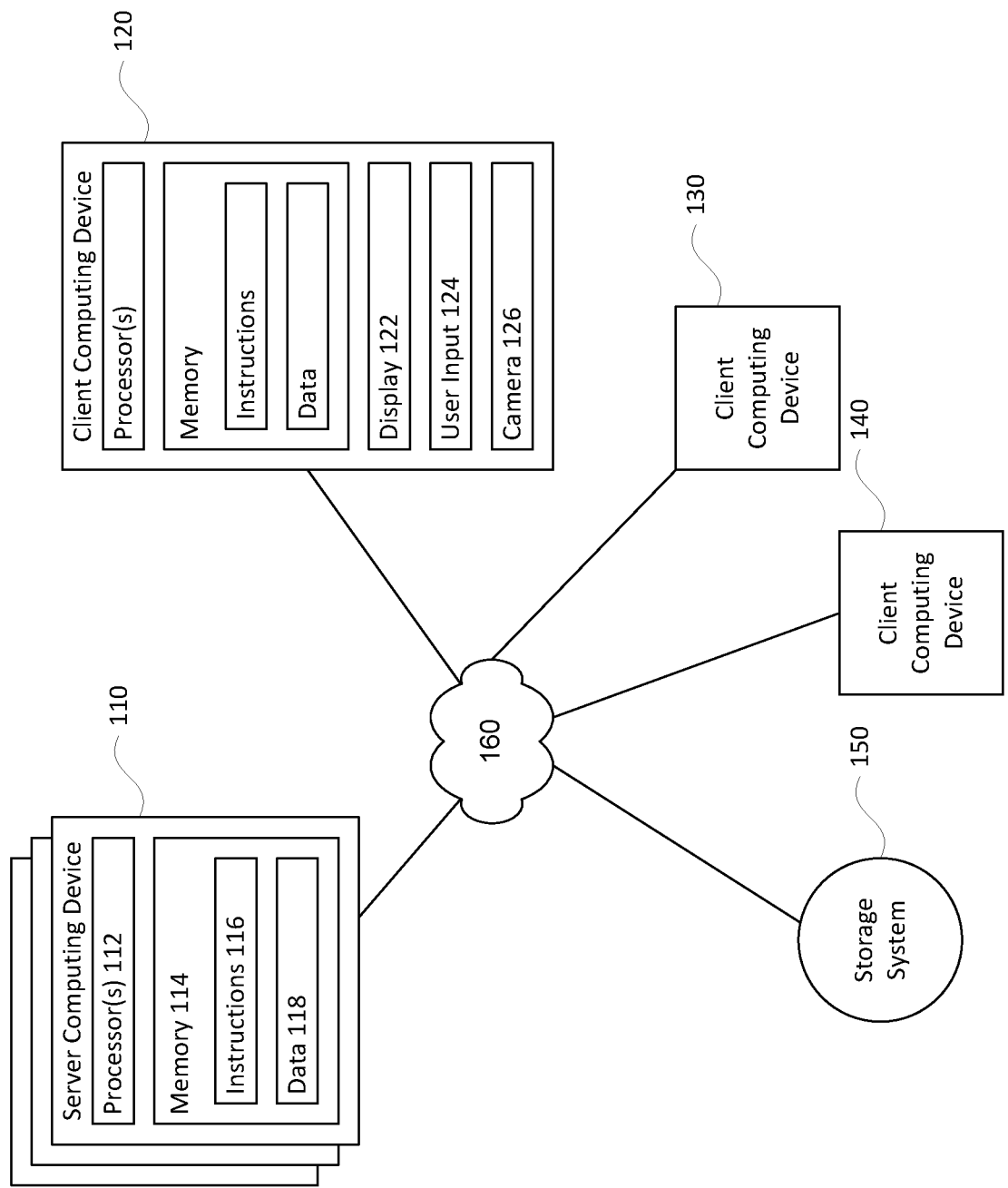
FIG. 1 is a functional diagram of an example system in accordance with aspects of the disclosure.

Aspects of the disclosure relate to creating wireless network access point models of locations to provide, for instance, location based services. As an example, scans of wireless network access point signatures, which are wireless network access point identifiers (for instance, MAC addresses) and associated signal strengths (for instance, RSSI on a scale from 0 dB to −120 dB where the closer to zero, the stronger the signal is) collected by mobile devices, can be used to generate such models. A plurality of these scans can be clustered together to create a model, for instance, using an adaptive K-means clustering method described below. K-means clustering partitions a set of vectors (v1, v2, . . . , vn) into K number of clusters S={S1, S2, . . . , Sk}, where each set corresponds to a Voronoi cell. Each cluster includes a vector representing a center of that cluster. To determine a location for a particular scan, one only need identify the cluster to which the scan belongs.

To generate one or more models of an area such as a mall, as noted above, a plurality of scans may be used. At least some of these scans may be collected by mobile devices being moved throughout the area. The mobile devices may thus provide information to a server computer including a series of scans corresponding to a visit to a location in or around the area. Each scan of the series has a timestamp, location, a set of network access point identifiers and associated signal strengths, as well as an associated confidence value. The confidence value may represent a combined confidence or accuracy measurement of the signal strength measurements and locations. As an example, some visits may be directly collected visits provided by persons who are specifically moving through the area to collect data with his or her mobile device. Other visits may be inferred visits, e.g., inferred from information provided by users of the location based service. As discussed further below, this data can be aggregated and used to determine clusters for a single model, or may be used to generate individual models, for individual use. Alternatively, the individual models may be combined into a single aggregated model.

In some examples, the scans may be pre-filtered numerous ways to reduce or remove noisy parts of the data. For instance, for each visit, the scans at the beginning and end of a series may be discarded based on the timestamps for the visit. Timestamps may also be used to order the scans, for instance, inverse chronologically so that only the most recent set are used to generate the one or more models. In addition, some wireless network access point identifiers may be filtered to remove those having extremely low occurrences for the plurality of scans or those which appear in duplicate.

Each scan of the plurality that remains after any filtering may be represented by a scan vector associated with a timestamp, location and confidence. Before using the K-means clustering, first minimum and maximum allowable similarity values for vectors within each of the clusters may be defined as well as a maximum value for K.

The adaptive K-means clustering may involve a split phase and a merge phase. In the split phase, a first scan vector of the remaining plurality may be assigned as the values for a vector at a center for a first cluster. All "bad" scan vectors, defined as those where the vector similarity value between the bad scan vector and the first scan vector v1 (or the vector data assigned center of the cluster) is less than the minimum allowable similarity value are identified. A "worst" scan of these bad scan vectors having the largest vector difference from center of the cluster (or lowest similarity value to the vector data at the center) is identified.

A new cluster is then created with the identified worst scan vector assigned as the values for a vector at a center of the new cluster. In this regard, the value of K is increased. K-means clustering is then used to assign each of the remaining plurality of scans to one of the clusters. The iterations of the K-means clustering end when the assignment of scans stabilizes such that the vector values of the centers do not change.

Again, all bad scan vectors are determined, and a worst scan vector of these bad scan vectors is identified. The worst scan vector is the scan vector of the bad scan vectors with the largest vector difference with the vector data assigned to the center of the cluster with a greatest number of scans. This worst scan vector is removed from the current cluster and the vector data is assigned as the vector values for a center of a new cluster, and the K-means clustering is repeated. The iterations of the aforementioned process continue until K reaches the maximum value for K or there are no bad scan vectors.

In the event that the maximum value of K has been reached but there are still a number of bad scans, the clusters may be filtered to remove outliers. This may include identifying whether there are any clusters having very few scans as such clusters may actually be outliers. If there are outliers, those clusters, as well as any assigned scan vectors, are removed and the K-means clustering of the split phase continues. Thereafter, the split phase continues until K again reaches the maximum value for K or there are no bad scan vectors. As a result of this filtering, the resulting clusters of the split phase may have a similar number of assigned scan vectors. This filtering may not even be utilized where the scan vectors are considered very reliable, for instance, when the scan vectors are from directly collected visits as opposed to inferred visits.

The resulting clusters are then processed again in a merge phase to merge any clusters with assigned scan vectors that are too similar to one another and have a relatively small number of assigned scans. Of course, this combining may have other requirements, such as that it be performed only if the combination will not create more bad scans or the total number of bad scans identified is within a predetermined threshold value. Once two clusters are merged, K-means clustering iterations are continued until the clusters are stable. This is repeated until there are no two clusters having centers with assigned vector data that are too similar to one another and have a relatively small number of assigned scans and if combined would not result in more or too many bad scans.

The locations of these clusters may be computed by averaging the associated locations of any assigned scan vectors. This can be computed once the clusters are generated in the split and/or merge phases. To further improve the locations of the centers of the clusters, each cluster may be re-centered based on the physical locations of the scan vectors assigned to each cluster.

Additional post filtering may be performed to increase the usefulness of the clusters. This may include relative and absolute filtering based on the number of scans in a particular cluster and/or the confidence values of the clusters.

The result of the adaptive K-means clustering and filtering described herein is a model of the area that can be used to easily identify a location of a given scan vector. For instance, each of the clusters in S will have a center with an assigned scan vector. To determine the location where a new scan is taken, a scan vector for the new scan is compared to the aforementioned assigned vector data for the cluster centers to identify the most similar assigned scan vector. The location of the new scan vector is thus the location of the cluster with the most similar assigned vector data. Moreover, because the clusters will each be assigned similar number of scan vectors and the assigned scan vectors are well distributed and different from one another, the model may provide very reliable location estimation. Again this information can be used to provide all types of location based services.

As noted above, the model may be generated from the directly collected visits and/or the inferred visits. Using one or the other type of data, as opposed to aggregating the data, allows for simpler treatment of the scans at the filtering stages as in the examples above, the directly collected visits may be considered more reliable than the inferred visits. In addition, it may be faster to generate individual models than to combine all of the data and try to generate a single data using the adaptive K-means clustering. Thus, one can actually generate one model of an area using directly collected visits and another model of an area using inferred visits. These separate models may then be combined together to generate an aggregate model.

The technique is also computationally efficient, as the adaptive nature of the clustering provided by the splitting and merging operations referred to above allows a server computer to produce models with bespoke values of K for particular areas, depending on the characteristics of those areas. This ensures that the server computer does not carry out more computations than is necessary, or desirable, when creating a model for a particular area, whilst at the same time ensuring that the model is highly effective when used to determine a location of a user device.

Example Systems

Figure 2:
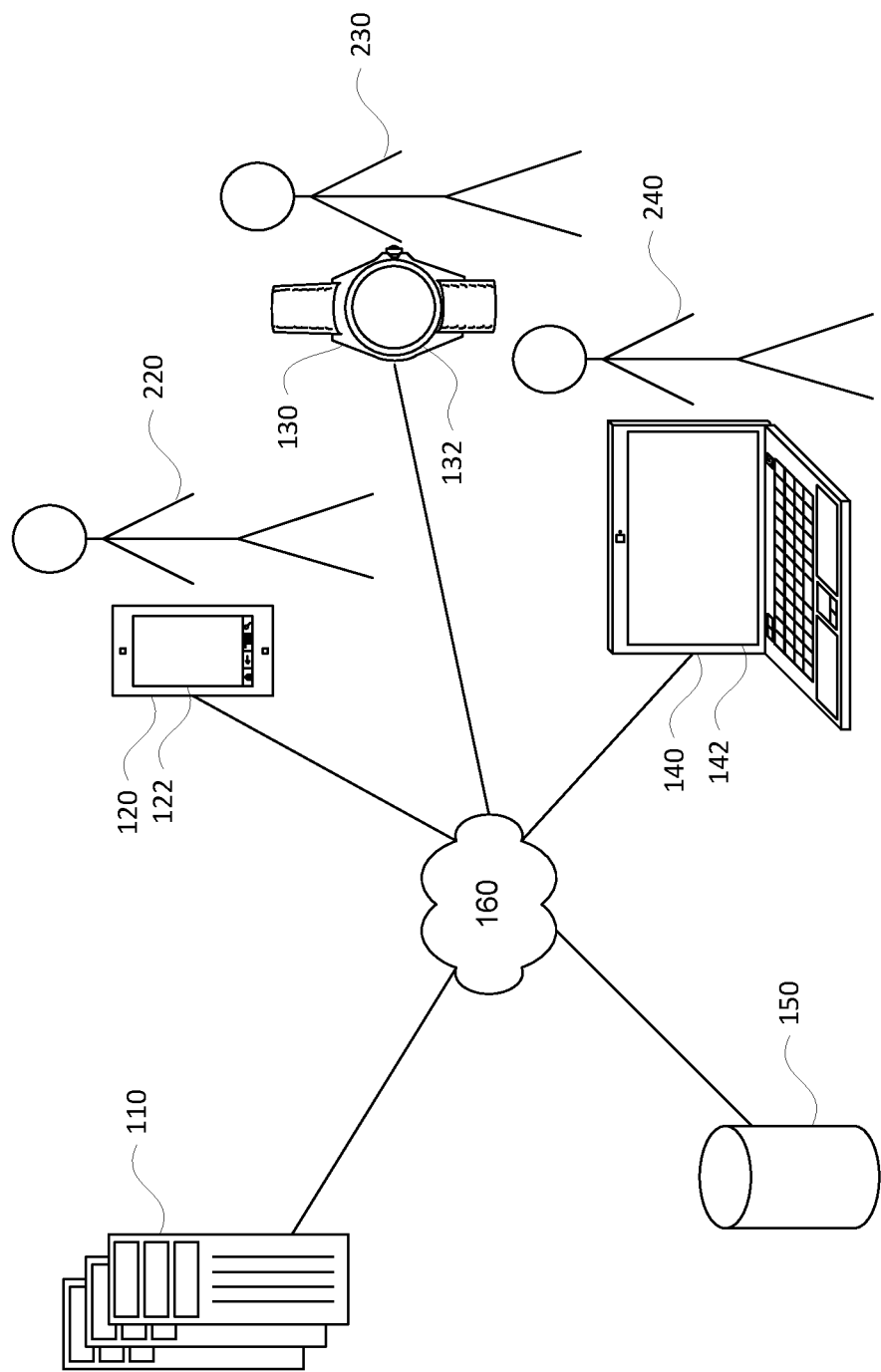
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touchscreen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

The storage system 150 may store various information, including scan data as well as model data. A plurality of mobile devices, such as mobile computing devices 120, 130, 140 may provide information to the server computing device 110 including a series of scans corresponding to a visit to a location in or around the area. Each scan of a series has a timestamp identifying a date and time at which the scan was captured, an estimated location (for instance, latitude and longitude coordinates), a set of network access point identifiers and associated signal strengths, as well as a confidence value. The confidence value may represent a combined confidence or accuracy measurement of the signal strength measurements and locations. This information may be stored by server computing device 110 in the storage system 150 for later retrieval and processing.

As an example, some visits may be directly collected visits provided by persons who are specifically moving through the area to collect data with his or her mobile device. Other visits may be inferred visits, e.g., inferred from information provided by users of the location based services.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The model data may include one or more wireless network access point models for various locations. The scan data from different sources, directly collector or inferred, can be aggregated and used to determine clusters for a single model, or may be used to generate individual models, for individual use. Alternatively, the individual models may be combined into a single aggregated model. Again, once generated by the server computing devices 110, the models may be stored in the storage system 150 and retrieved as needed to determine locations as described further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Prior to determining any clusters, the scans may be pre-filtered numerous ways to reduce or remove noisy parts of the data. For instance, for each visit, the scans at the beginning and end of a series may be discarded based on the timestamps for the visit. An extraction rate may be used to extract a portion of the scans of a single visit As an example, for the inferred scans, an extraction rate of 0.5 (or 50%), or more or less, may be used such that only the middle portion of a visit to the area is used to generate the one or more models. This can greatly reduce noise in an inferred visit as the boundaries (start and end timestamps) of an inferred visit can be very difficult to discern. Of course, for more reliable scans such as the directly collected scans the extraction rate may be closer to 1.0 (or 100%) so that all of the directly collected data is used because the directly collected data is likely to be much more accurate. In addition, any scans having very low confidence values or those that do not meet a minimum threshold confidence value, such as 30 on a scale of 0 to 100, may also be filtered to remove noise, as well as scans having older timestamps, such as those older than 60 days or more or less, to ensure the usefulness of the data. Timestamps may also be used to order the scans, for instance, inverse chronologically so that only the most recent set, for instance of 15,000 scans or more or less, are used to generate the one or more models. In addition, some wireless network access point identifiers may be filtered to remove those having extremely low occurrences for the plurality of scans or those which appear in duplicate.

Each scan of the plurality that remains after any filtering may be represented by a scan vector associated with a timestamp, location and confidence. For instance, each scan vector v, corresponds to a mapping from a specific wireless network access point identifier to a signal strength for a given scan taken at a particular timestamp t and location (x,y which may represent latitude and longitude coordinates)), having a particular confidence value c. For instance, for a scan vector vn with a timestamp tn, a location (xvn,yvn) and with a confidence cvn, vn may define a list of signal strengths for all wireless network access point identifiers of all of the plurality of scans used to make the model.

Before using the K-means clustering, first minimum and maximum allowable similarity values for vectors within each of the clusters may be defined as well as a maximum value for K. As an example, the similarity between two vectors, v1 and v2, may be defined as cos_similarity(v1, v2), wherein cos_similarity represents the cosine similarity between the two vectors v1 and v2. The distance or vector difference between two vectors v1 and v2 may be defined as 1−cos_similarity(v1, v2). The minimum similarity value may be defined as the minimum of the cos_similarity (min_cos_similarlity), and the maximum value may be defined as the maximum of the cos_similarity (max_cos_similarlity).

In one example, the minimum and maximum values may be set to the same value, for instance a number between 0 and 1, such as 0.2, 0.5 or 0.7. Selection of these values may be made based upon the reliability of the data as well as the type of location (a mall, where the value may be higher, versus a small house, where the value may be lower). If too high, there will be too many clusters and if too low, there may not be enough. The maximum value for K may be set to limit the amount of time for the server computer to perform the clustering.

Figure 4:
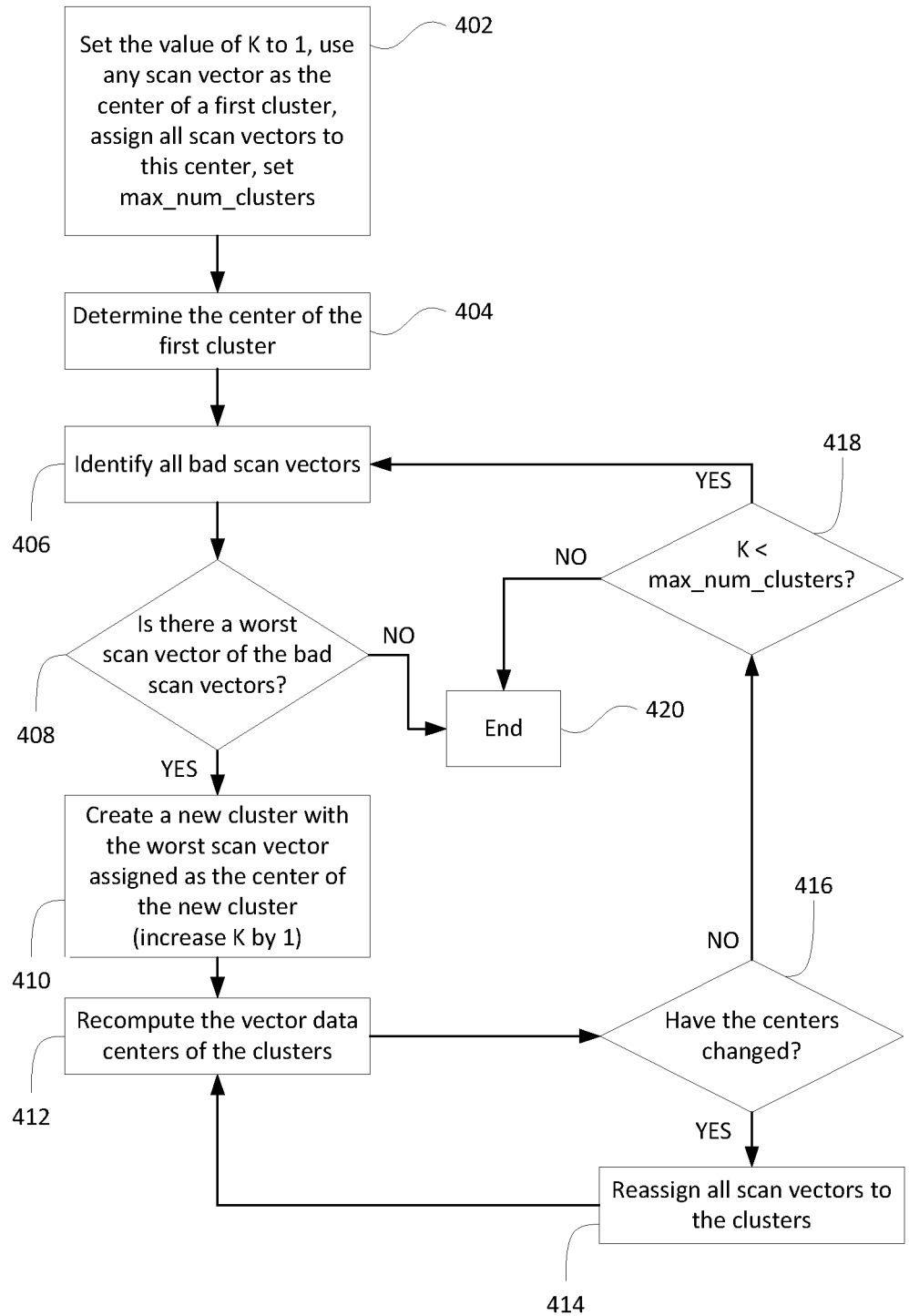
FIG. 4 is a flow diagram representing aspects of the split phase in accordance with aspects of the disclosure.

The clustering may be an adaptive K-means clustering which involves a split phase and a merge phase. The clusters are created in the split phase as shown in FIGS. 3-4. FIG. 3 is an example of quasi code representing aspects of the split phase while FIG. 4 is a flow diagram representing aspects of the split phase. In the beginning of the split phase at block 402 of FIG. 4, the maximum number of clusters (max_num_clusters) is set. In addition, a first scan vector, for example v1, of the remaining plurality may be assigned as the vector data at a center for a first cluster. The selection of the first scan vector may be random or not random. For efficiency, the value of K may be initially set to 1. In this regard, vector data associated with the first scan vector v1 becomes is assigned to the center of the first cluster and all scan vectors are assigned to this first cluster.

Thereafter at block 406, all "bad" scan vectors, defined as those scan vectors where the vector difference between the bad scan vector and the first scan vector v1 (or the center of the cluster) is greater than the minimum similarity value or 1−min_cos_similarity, are identified. At block 408, the "worst" scan of these bad scan vectors, or the bad scan vector that has largest vector difference from the vector data assigned to the center of the cluster, or rather, the largest value of 1−cos_similarity, is identified.

A new cluster is then created with the identified worst scan vector assigned as the values for a vector at a center of the new cluster as shown in block 410. In this regard, the value of K is increased by 1, (or from K=1 to K=2). At this point, the K-means clustering is used to assign each of the remaining plurality of scans to one of the clusters as shown in blocks 412, 414, and 416. First, the vector data assigned to the centers of each cluster are recomputed according to the assignments at block 412. For instance, new vector data may be generated for each cluster by shifting all signal strengths of any assigned vectors by +120 dB (for instance −120 dB becomes 0 dB and 0 dB becomes 120 dB), so that all strengths within each scan vector are positive, and computing the vector average of all assigned scan vectors. To compute the vector average of a set of scan vectors assigned to a cluster, the average of strengths for each network access point identifier is determined. In other words, a new vector for a center of a cluster is computed as the mean of all assigned scans vectors for that cluster. If the vector data assigned to the centers has changed, at block 416, the scan vectors are reassigned again at block 414 and the vector data assigned to each center is recomputed at block 412. These iterations end when the assignment of scans stabilizes such that the vector data assigned to the centers of the clusters does not change at block 416.

As shown in block 418, so long as the number of clusters K is less than the maximum number of clusters, the process returns to block 406 where all bad scan vectors are determined. Again, at block 408, a worst scan vector of these bad scan vectors is identified. The worst scan vector is the scan vector of the bad scan vectors with the largest vector difference, or largest value of 1−cos_similarlity, with the vector data assigned to the center of the cluster with a greatest number of assigned scan vectors. This worst scan vector is removed from the current cluster and the can vector is assigned as the vector data for a center of a new cluster at block 410, and the K-means clustering of blocks 412, 414, and 416 is repeated as described above. The iterations of the aforementioned process continue until K reaches the maximum value for K at block 418 or until there are no bad scan vectors at block 408. In other words, there are no vectors with vector differences from centers of assigned clusters that are greater that 1−min_cos_similarity. Thereafter, the split phase ends at block 420.

In the event that the maximum value of K has been reached at block 418 but there remain a number of bad scans, the clusters may be filtered to remove outliers. This may include identifying whether there are any clusters having very few scans as such clusters may actually be outliers. As an example, a threshold ratio may be used. This threshold ratio may be the number of scans assigned to a given cluster relative to the number of clusters assigned to the cluster with the greatest number of assigned scan vectors. This ratio value may thus range between 0 and 1 and may be dependent upon the source of the data. For instance, the threshold ratio may be set to 0.1 or more or less for directly collected data and 0.5 for inferred visit in order to allow for the removal or more scan vectors (on an assumption that the inferred visits include more scans and noisier data). For example, assuming the threshold ratio is 0.1, if the greatest number of scan vectors assigned to any given cluster is 20, and a first cluster has 1 scans (<2, 0.1 of 20), the first cluster will be removed for surveyed scans. But if a second cluster has 3 scans, the second cluster will stay, or rather, will not be removed. Similarly, where the threshold ratio is 0.5, and the cluster with the greatest number of assigned scan vectors is has 100 assigned scan vectors, a third cluster with 20 scans will be removed (<0.5).

If there are outlier clusters, those clusters, as well as any assigned scan vectors, are removed and the K-means clustering of the split phase continues at blocks 412, 414, and 416 of FIG. 4. Thereafter, the split phase continues until K again reaches the maximum value for K or there are no bad scan vectors as discussed above. As a result of this filtering, the resulting clusters of the split phase may have a similar number of assigned scan vectors. This filtering may not even be utilized where the scan vectors are considered very reliable, for instance, when the scan vectors are from directly collected visits as opposed to inferred visits.

Figure 6:
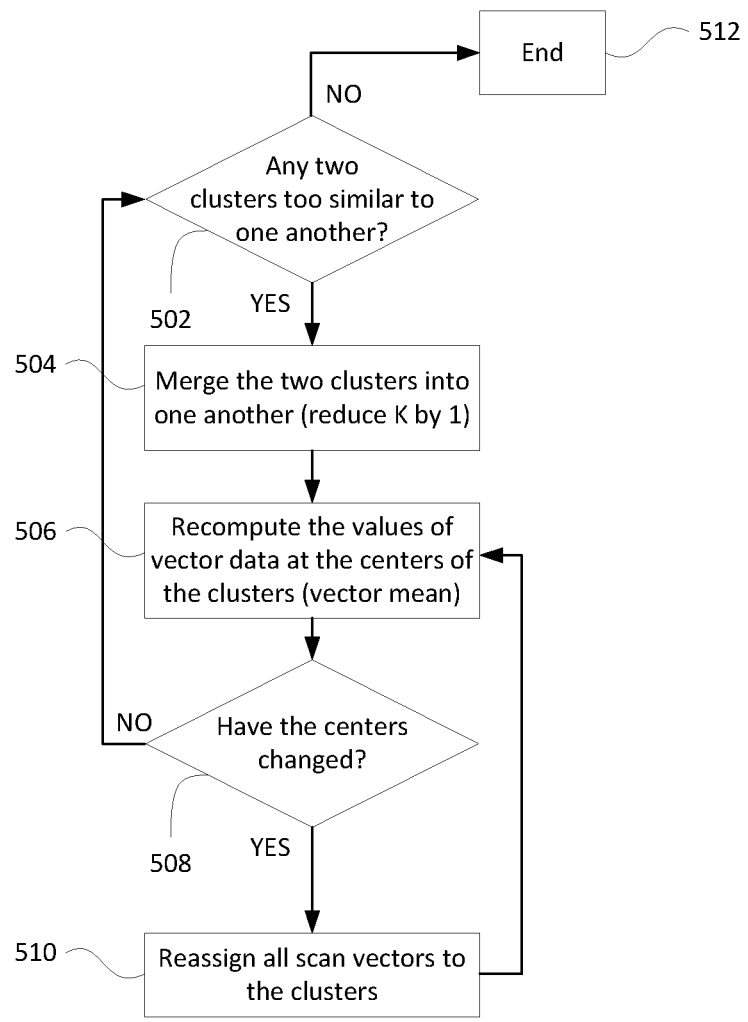
FIG. 6 is a flow diagram representing aspects of the merge phase in accordance with aspects of the disclosure.

The clusters resulting from the split phase are then processed again in a merge phase to merge any clusters with assigned scan vectors that too similar to one another and have a relatively small number of assigned scans. FIG. 5 is an example of quasi code representing aspects of the merge phase while FIG. 6 is a flow diagram representing aspects of the merge phase. The merge phase begins at block 502 where a pair or two clusters that are too similar and each have a relatively small number of assigned scan vectors (not shown in the flow diagram for simplicity) are identified. For instance, two clusters may be considered too similar if the cos_similarity between the assigned vector values for the respective centers of the two clusters is greater than the max_cos_similarity. Two clusters may be considered to have a relatively small number of assigned scan vectors when the number of scan vectors assigned to each one of the two clusters is relatively small as compared to the number of scan vectors assigned to the cluster with the greatest number of assigned scan vectors. A second threshold ratio, greater than the first threshold ratio, may be used to identify clusters with small number of assigned scan vectors. If both of these requirements are met, the two clusters may be merged at block 504. Of course, the combining may be based on other requirements, such as that it be performed only if the combination will not create any bad scan vectors or the total number of bad scan vectors identified is within a predetermined threshold number of acceptable bad scan vectors such as 0, 2 or more or less.

Once two clusters are merged at block 504, the total number of clusters K is reduced by 1. Thereafter, K-means clustering is performed as shown in blocks 506, 508, and 510. These iterations continue until the clusters are stable as discussed above with regard to FIG. 3. The process 600 is repeated until there are no two clusters that are too similar to one another and have a relatively small number of assigned scans and if combined would not result in more or too many bad scan vectors at block 502. Thereafter, the merge phase ends at block 512.

The result of the adaptive K-means clustering provides a set of clusters having particular characteristics. For example, the vector difference from each given scan vector to the vector data assigned to the center of the cluster to which the given scan vector is assigned is less than 1−min_cos_similarity, or the similarity is greater than min_cos_similarity. In addition, the vector difference between the vector data assigned to the centers of any two clusters is greater than 1−max_cos_similarity or the similarity is less than max_cos_similarity. The locations (for instance, latitude and longitude coordinates) of each cluster remaining after any filtering may be computed by averaging the associated locations (for instance, latitude and longitude coordinates) of any assigned scan vectors. This can be computed once the clusters are generated in the split and/or merge phases.

Figure 8:
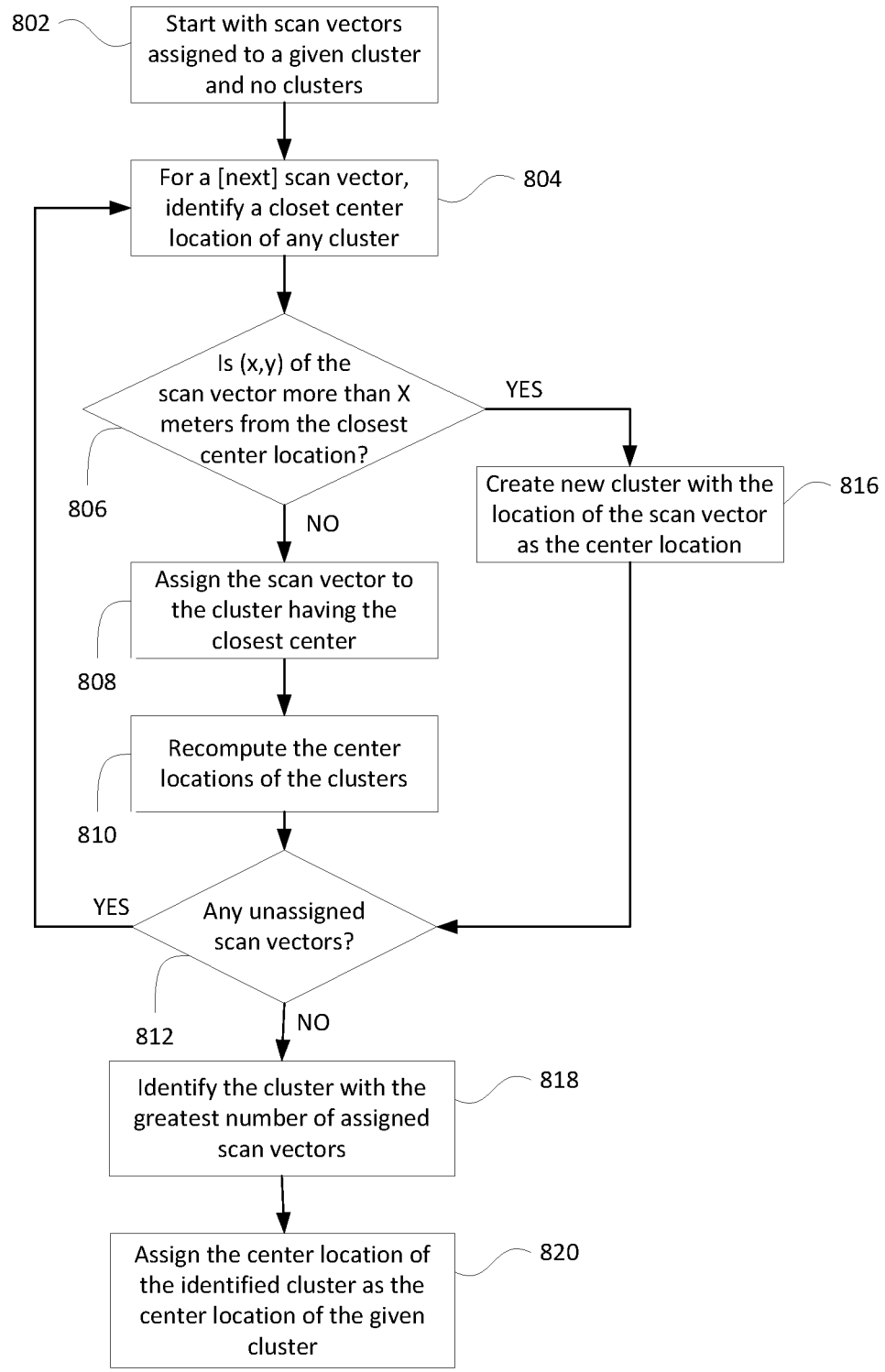
FIG. 8 is a flow diagram representing aspects of the re-centering process in accordance with aspects of the disclosure.

To further improve the locations of the centers of the clusters, each cluster may be re-centered. FIG. 7 is an example of quasi code representing aspects of the re-centering while FIG. 8 is a flow diagram representing aspects of the re-centering process. This re-centering processing may be performed for each individual cluster and any scan vectors assigned to that cluster and may involve generating new set of clusters from the scan vectors assigned to the given cluster. For instance as shown in FIG. 8, initially at block 802, there are no clusters, only the scan vectors assigned to the given cluster. To begin, the assigned scan vectors are now unassigned and the new set of clusters is empty. At block 804, for a first scan vector (of the unassigned scan vectors) a closest center location of a cluster is identified. The selection of the first scan vector may be random or not random. At block 806, if the distance between location of the first scan vector and the closest center location is less than some assigned threshold distance value (e.g., X meters), the first scan vector is assigned to the cluster with the closest center location at block 808, and the location of the center of the given cluster is recomputed at block 810. As an example, the threshold distance value of X may be set to 100 meters or more or less. The center location (for instance, latitude and longitude coordinates) of each cluster may be computed by averaging the associated locations (for instance, latitude and longitude coordinates) of any assigned scan vectors. Returning to block 806, if the distance greater than the threshold distance value, a new cluster is created with its center location at the location associated with the first scan vector at block 816. Of course, initially, there are no clusters in the new set of clusters and thus no center locations. Accordingly, there is no center location within the threshold distance value of the location of the first scan vector, so the first scan vector is used as a center location for a new cluster of the new set of clusters (for the given cluster) at block 816.

The re-centering process then continues at block 812. When there are unassigned scan vectors, a closest center location of a cluster is identified for a next scan vector at block 804. At block 806, if the distance between location of the next scan vector and the closest center is less than some threshold distance value (X meters), the next scan vector is assigned to the cluster with the closest center location at block 808, and the center location of the center of the given cluster is recomputed at block 810. Again the center location (for instance, latitude and longitude coordinates) of a cluster may be computed by averaging the associated locations (for instance, latitude and longitude coordinates) of any assigned scan vectors. Once again, returning to block 806, if the distance greater than the threshold distance value, another new cluster is created and added to the new set of clusters with its center at the location of the first scan vector at block 816.

Thereafter, the rest of the unassigned scan vectors are assigned to an existing cluster or a new cluster of the new set of clusters in the same manner. In other words, iterations of the process through blocks 806 to 812 continue until each of the scan vectors have been assigned at block 812 and the new set of clusters is no longer empty. At this point, the cluster of the new set of clusters with the greatest number of assigned scan vectors is identified at block 818. The center location of this identified cluster is then assigned as the center location of the given cluster at block 820. Again, this process may be repeated for each cluster generated using the split and merge phases described above. This re-centering reduces the effect of noise from the locations of the scan vectors caused by incorrect location information, such as where the locations of the scan vectors of a visit "jump" around.

Additional post filtering may be performed to increase the usefulness of the clusters. This may include relative and absolute filtering based on the number of scans in a particular cluster and/or the confidence values of the clusters. For the relative filtering, the cluster having the greatest number of assigned scan vectors is identified as the largest cluster. Any clusters having too few scan vectors relative to this largest cluster may be removed. The relative value may thus be a ratio that is selected based on the type of visit and reliability of the scan vectors. For instance, where the scan vectors are from inferred visits, a higher ratio, or one that is closer to 1 may be used, such as 0.5 or more or less. Where the scan vectors are from directly collected visits, a lower ratio may be used, or one that is closer to zero, such as 0.1 or more or less.

Absolute filtering may require that the number of scan vectors assigned to a given cluster be at least some minimum value. Again, this minimum number of assigned scan vectors or minimum value may be selected based on the type of visit and reliability of the scan vectors. For instance, where the scan vectors are from inferred visits a higher minimum value may be used, such as 100 scans or more or less (in the example of 15,000 scan vectors in the remaining plurality of scan vectors). Where the scan vectors are from directly collected visits, a lower minimum value may be used, such as 10 or 15 or more or less (in the example of 15,000 scan vectors in the remaining plurality of scan vectors). The number of scan vectors from each cluster is thus compared to the minimum value. Any clusters which do not have enough assigned scan vectors to meet the minimum value may be discarded. Again, the absolute filtering may not even utilized where the scan vectors are considered very reliable, for instance, when the scan vectors are from directly collected visits as opposed to inferred visits.

Absolute filtering may additionally or alternatively require that confidence value for a given cluster be at least some minimum value. The confidence value of a given cluster may be set as the highest one of the confidences value c associated with the scan vectors assigned to the given cluster. If the highest confidence value for any cluster is less than a minimum confidence value, that cluster may be discarded. Again, the absolute filtering may not even utilized where the scan vectors are considered very reliable, for instance, when the scan vectors are from directly collected visits as opposed to inferred visits.

As noted above, the model may be generated from the directly collected visits and/or the inferred visits. Using one or the other type of data, as opposed to aggregating the data, allows for simpler treatment of the scans at the filtering stages as in the examples above, the directly collected visits may be considered more reliable than the inferred visits. In addition, it may be faster to generate individual models than to combine all of the data and try to generate a single data using the adaptive K-means clustering. Thus, one can actually generate one model of an area using directly collected visits and another model of an area using inferred visits. These separate models may then be combined together to generate an aggregate model.

In one scenario, the aggregate model may be generated as follows. After post filtering each of the clusters of different models, the technique may evaluate whether a cluster actually belongs to a particular place of interest, or whether it really is associated with a different place such as a neighboring store or other location. For instance, in some examples, in addition to a timestamp, location, a set of network access point identifiers and associated signal strengths, and an associated confidence value, each scan may also be associated with a place tag. The place tag may designate a particular area at which the scan was collected. In this regard, a place tag may be broader than a specific point or location (or a latitude and longitude point with some associated error or confidence values), and may include many different locations representing a particular point of interest such as a store within a mall, a building, or some other larger area. For the collected visits, place tags may be assigned by a user who collected the scans at or proximate the time of collection, for instance, by specifically typing in or selecting the place tag from a list of nearby options. For the inferred visits, the place tags may be assigned manually or by "inferring" a place tag based on GPS or other location information from the time of the scan. Because of this, the place tags of the collected visits may be considered more reliable than those of the inferred visits. The place tags may be used to identify data for a given model of a particular place. In this regard, all scans for a given model may be associated with the same or similar place tag.

Again, as noted above, prior to combining a model generated from collected visits with a model generated from inferred visits, the place tags may be used to filter the data. To do this, the scan data assigned to the center of each given cluster of the models to be combined may be considered an individual scan. These, individual scans may be compared to the scan data of the center of each of the clusters of the model generated from the collected visits. For each individual scan, the comparisons may be used to generate a ranked list of place tags from the different models generated from the collected visits each with an associated confidence value. In other words, all scan data assigned to the clusters of both models may be compared to only the scan data assigned to centers of clusters of models generated from the collected visits. As an example, the confidence may range on a scale from 1 to 100. The place tag having the greatest confidence value (or the cluster at the top of the list) may be called the "inferred to" or "inference" place tag for the given cluster. This inference may then be used to determine whether to keep a given cluster.

For instance, in one example there may be a set of place tags, A, B, C, D, each associated with a model created using collected visits or collected visit model A, collected visits, collected visit model B, collected visit model C, and collected visit model D. In addition, another set of place tags B, C, D, and E, may each be associated with a model created using inferred visits or inferred visit model B, inferred visit model C, inferred visit model D, and inferred visit model E. For a cluster of the inferred visit model for B, for instance B_inferred_1, the vector data assigned to the center of the cluster B_inferred_1 is matched to the vector data assigned to the centers each of the clusters of collected visit model A, collected visits, collected visit model B, collected visits, collected visit model C, and collected visit model D. If the cluster B_inferred_1 belongs to collected visit model B with high confidence (higher than 100-Y confidence as discussed with regard to the example of FIG. 9 below), the cluster B_inferred_1 may be kept in the inferred visit model B. If the cluster B_inferred_1 belongs to collected visit model A, collected visits, collected visit model C, or collected visit model D with low confidence (lower than Y confidence as discussed with regard to the example of FIG. 9 below), the cluster B_inferred_1 may be kept in the inferred visit model B. Otherwise, the cluster B_inferred_1 may be deleted or filtered from the inferred visit model B. For a cluster in the inferred visit model E, E_inferred_1, which is not a model generated from collected visits, E_inferred_1 may be deleted or filtered from the inferred visit model E. The cluster E-inferred_1 would not infer to the place tag E, because that cluster presumably would not exist in any collected visit model (i.e. there is no collected visit model E). However, if the cluster from inferred to collected visit model A, collected visits, collected visit model B, collected visit model C, and collected visit model D with low probability, the cluster may be kept in the inferred visit model E. Otherwise E_inferred_1 may be deleted or filtered from the inferred visit model E.

FIG. 9 is an example of quasi code representing aspects of this cross filtering. In other words, clusters that are either inferred to other place with higher than 100-Y confidence or inferred to themselves with less than Y confidence may be filtered. In the example of FIG. 9, the value of Y confidence may be set to anywhere between 60 and 90, or more or less. Thus, after this filtering, the clusters within the models are at least consistent with the model generated from the collected visits.

Then different K-means models may be combined by merging K-means clusters. Here, two thresholds are evaluated, one for a minimum cos_similarity (min_cos_similarity), and one for a maximum cos_similarity (max_cos_similarlity). These values may be the same or different from those described above. By way of example, FIG. 10 is an example of quasi code representing aspects of combining models. This example assumes there are two K-means models, A and B. In general, lower order models may be combined into a higher order model. A may be considered a higher order model than B if A is considered more reliable. As an example, A may be a model generated from collected visits, and B may be a model generated from inferred visits. One cluster (cluster 1) in model B may be added to model A if, and only if, there exists a cluster (cluster 2) in A such that the cosine similarity of the vector data of the centers of these two clusters (cluster 1 and cluster 2) is greater than or equal to min_cos_similarlity. And based on this, next find a cluster (cluster 3) in model A that has the highest cosine similarity with that cluster (cluster 1) in model B. If the cosine similarity of these two clusters is greater than the max_cos_similarlity, then the process merges these two clusters. In this regard, if the first threshold (a.) is not met, the cluster in B (cluster 1) is discarded. Otherwise, if the first threshold (a.) is met, but not the second (b.), the cluster in model B is added to model A. In this manner, models from different sources may be combined.

The technique is also computationally efficient, as the adaptive nature of the clustering provided by the splitting and merging operations referred to above allows the server computer to produce models with bespoke values of K for particular areas, depending on the characteristics of those areas. This ensures that a server computer does not carry out more computations than is necessary, or desirable, when creating a model for a particular area, whilst at the same time ensuring that the model is highly effective when used to determine a location of a user device.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method of generating a wireless network access point model for determining locations within an area, the method comprising:
   receiving a plurality of scan vectors, each scan vector comprising data representing a set of signal strengths for a set of wireless network access point identifiers and being associated with a location within the area at which a mobile device moving through the area measured the set of signal strengths;
   performing a split phase to generate a set of clusters including:
      assigning each scan vector of the plurality of scan vectors to a cluster based on a vector difference between the scan vector and vector data assigned to a center of the cluster to which the scan vector is assigned,
      identifying, as candidates for initiation of an additional cluster, one or more scan vectors of the plurality of scan vectors as being scan vectors for which a difference between the scan vector and the vector data assigned to the center of the cluster to which the scan vector is assigned is less than a predetermined minimum similarity value for the clusters,
      selecting, from the one or more scan vectors identified as candidates for initiation of an additional cluster, a scan vector which is least similar to the vector data assigned to the center of the cluster to which the scan vector is assigned,
      creating an additional cluster in the set of clusters and assigning the selected scan vector to the additional cluster,
      assigning vector data of the selected scan vector to a center of the additional cluster,
      recomputing vector data assigned to centers of any clusters of the set of clusters, and
   iterating through the split phase until a total number of clusters in the set of clusters equals a predetermined maximum number of clusters or until no further candidates for initiation of an additional cluster are identified; and
   generating the model for determining locations within the area based on the set of clusters.

2. The method of claim 1, further comprising, prior to performing the split phase, setting the number of clusters to 1 and assigning a first vector scan of the plurality of scan vectors as a center of a first cluster of the set of clusters.

3. The method of claim 1, wherein when the number of clusters equals the maximum number of clusters, the method comprises:
   filtering the clusters to identify outliers; and
   removing the outliers and the assigned scan vectors to thereby reduce the total number of clusters in the set of clusters.

4. The method of claim 3, further comprising, after filtering to remove outliers, continuing to iterate through the split phase until the number of clusters again equals the maximum number of clusters or there are no one or until no further candidates for initiation of an additional cluster are identified.

5. The method of claim 1, comprising:
   identifying at least two of the clusters in the set of clusters as being candidates for a cluster merging operation; and
   merging the at least two clusters into a merged cluster to reduce the total number of clusters in the set of clusters, wherein the scan vectors previously assigned to the at least two clusters are re-assigned to a merged cluster.

6. The method of claim 5, wherein identifying the at least two clusters in the set of clusters as being candidates for the cluster merging operation comprises:
   identifying the clusters as comprising a total number of scan vectors lower than a threshold amount.

7. The method of claim 5, wherein identifying the at least two clusters in the set of clusters as being candidates for the cluster merging operation comprises:
   identifying that a difference between the vector data assigned to the center of a first of the clusters and vector data assigned to the center of a second of the clusters is less than a predetermined threshold value.

8. The method of claim 1, further comprising:
   identifying, from the clusters in the set of clusters, a cluster comprising a highest number of scan vectors;
   for each of the other clusters in the set of clusters, determining at least one of a number of scan vectors in the cluster and at least one confidence indicator associated with the scan vectors in the cluster;
   filtering said other clusters based on at least one of the number of scan vectors in the cluster and the at least one confidence indicator associated with the scan vectors in the cluster;
   based on said filtering, selecting at least one of said other clusters; and
   outputting a subset of the plurality of clusters for use in location determining operations, the subset comprising the cluster identified as comprising the highest number of scan vectors and the selected at least one of said other clusters.

9. The method of claim 8, wherein the set of clusters upon which generation of the model is based corresponds to the subset of clusters only.

10. The method of claim 1, further comprising:
    determining, for each cluster in the set of clusters, a center location based on the locations associated with the scan vectors assigned to the cluster; and
    for each cluster, recentering the center location of the cluster based on distances between the locations associated with the scan vectors assigned to the cluster and the center location.

11. A computer-implemented method comprising:
    receiving a plurality of clusters of scan vectors determined from signals received from a plurality of wireless access points;
    identifying, from the plurality of clusters, a clusters comprising a highest number of scan vectors;
    for each of the plurality of clusters other than the cluster identified as comprising the highest number of scan vectors, determining at least one of a number of scan vectors in the cluster and at least one confidence indicator associated with the scan vectors in the cluster;
    filtering said other clusters based on at least one of the number of scan vectors in the cluster and the at least one confidence indicator associated with the scan vectors in the cluster;

based on said filtering, selecting at least one of said other clusters; and outputting a subset of the plurality of clusters for use in location determining operations, the subset comprising the cluster identified as comprising the highest number of scan vectors and the selected at least one of said other clusters.

12. A method of generating a wireless network access point model for determining locations within an area, the method comprising:

receiving, by one or more server computing devices having one or more processors, a plurality of scan vectors, each scan vector representing a set of signal strengths for a set of wireless network access point identifiers and being associated with a location within the area at which a mobile device moving through the area measured the set of signal strengths;

setting, by the one or more server computing devices, a maximum number of clusters;

setting, by the one or more server computing devices, a minimum similarity value;

performing, by the one or more server computing devices, a split phase to generate a set of clusters including:

assigning each given scan vector of the plurality of scan vectors to a cluster based on a vector difference between the given scan vector and vector data of the assigned cluster, identifying one or more bad scan vectors of the plurality of scan vectors based on whether a vector difference each of the one or more bad scan vectors and vector data assigned to a center of a cluster to which each of the one or more bad scan vectors is assigned is less than the minimum similarity value, selecting a worst one of the one or more bad scan vectors having a greatest vector difference between the one or more bad scan vectors and vector data of a center of an assigned cluster for the worst scan vector, using the selected worst one as a center of a new cluster and thereby increasing a number of clusters in the set of clusters, recomputing vector data assigned to centers of any clusters of the set of clusters, and iterating, by the one or more server computing devices, through the split phase until the number of clusters in the set of clusters equals the maximum number of clusters or there are no one or more bad scan vectors identified; and generating the model of the area based on the set of clusters.

13. The method of claim 12, wherein similarity between two scan vectors, $v_1$ and $v_2$, may be defined as cosine similarity$(v_1, v_2)$, the minimum similarity value is a minimum cosine similarity, and selecting the worst one includes identifying one of the one or more bad scans having the largest value of cosine similarity between the identified one and the center of the assigned cluster of the identified one.

14. The method of claim 12, further comprising, prior to performing the split phase, setting the number of clusters to 1 and assigning a first vector scan of the plurality of scan vectors as a center of a first cluster of the set of clusters.

15. The method of claim 12, wherein the split phase further includes:

after recomputing vector data assigned to centers of any clusters of the set of clusters, determining whether the vector data assigned to centers of any clusters of the set of clusters has changed, when the vector data assigned to centers of any clusters of the set of clusters has changed, reassigning the plurality of scan vectors to clusters of the set of clusters, and continuing to recompute and reassign until the clusters of the set of clusters stabilize such that the vector data assigned to the centers of the any clusters does not change from the recomputing.

16. The method of claim 12, wherein when the iterating ends when the number of clusters equals the maximum number of clusters, filtering any clusters to remove outliers.

17. The method of claim 16, further comprising, after filtering, continuing to iterate through the split phase until the number of clusters again equals the maximum number of clusters or there are no one or more bad scan vectors identified.

18. The method of claim 12, further comprising:

setting, by the one or more server computing devices, a maximum similarity value;

performing a merge phase including:

identifying a pair of clusters of the set of clusters having vector data assigned to respective centers of each one of the pair having a similarity value that is greater than the maximum similarity value, and merging the pair of clusters and any assigned scan vectors together.

19. The method of claim 18, wherein identifying the pair of clusters is based on cosine similarity between the vector data assigned to the respective centers.

20. The method of claim 18, further comprising repeating the merge phase until there are no pairs of clusters of the set of clusters having a similarity value that is greater than the maximum similarity value.

21. The method of claim 18, wherein identifying the pair of clusters is further based on a number of scan vectors assigned to each cluster of the pair of clusters.

22. The method of claim 12, further comprising, setting a maximum similarity value, wherein iterations through the split phase and merge phase provides the set of clusters such that in each given cluster of the set of clusters:

a vector difference between each scan vector assigned to the given cluster and a scan vector of a center of the given cluster is greater than the minimum similarity value, and a vector difference between the scan vector of the center of the given cluster and a scan vector of a center of any other cluster of the set of clusters is less than a maximum similarity value.

23. The method of claim 12, further comprising:

determining a center location of each given cluster of the set of clusters based on the locations associated with the scan vectors assigned to the given cluster; and recentering the center location of each given cluster based on distances between the locations associated with the scan vectors assigned to the given cluster and the center location.

24. The method of claim 23, wherein recentering is based on whether the distances meet a threshold distance value.

25. The method of claim 12, further comprising, before generating the model, filtering the set of clusters by:

identifying a cluster of the set of clusters having a greatest number of assigned scan vectors; and filtering one or more clusters from the set of clusters based on a comparison to this greatest number of assigned scan vectors.

26. The method of claim 12, further comprising, before generating the model, filtering the set of clusters to remove any clusters that do not meet a minimum number of assigned scan vectors.

27. The method of claim 12, wherein each given scan vector of the plurality of scan vectors is associated with a confidence value representing a combined accuracy measurement of the signal strength measurements and an estimated location for the given scan vector, and the method further comprises, before generating the model, filtering the set of clusters based on a highest confidence value associated with the scan vectors assigned to each cluster of the set of clusters.

28. The method of claim 27, wherein filtering the set of clusters includes removing clusters from the set of clusters having a highest confidence value that does not meet a threshold confidence value.

29. The method of claim 12, wherein at least a subset of the plurality of scan vectors corresponds to a single visit to the area by a particular mobile device, such that the single visit includes a plurality of scans, and the method further comprises filtering the plurality of scans to remove scans at a start boundary and an end boundary of the visit, such that the filtered scans are not included in the plurality of scan vectors.

30. The method of claim 29, wherein filtering the plurality of scans is based on an extraction rate selected to remove noise when generating the model.

31. The method of claim 12, wherein each given scan vector of the plurality of scan vectors is associated with a confidence value representing a combined accuracy measurement of the signal strength measurements and an estimated location for the given scan vector, and the method further comprising, prior to performing the split phase, filtering the plurality of scan vectors to remove scan vectors associated with a confidence value that does not meet a threshold confidence value to remove noise from the model.

* * * * *